United States Patent
Misaizu

(10) Patent No.: US 11,800,019 B2
(45) Date of Patent: Oct. 24, 2023

(54) IMAGE INSPECTION APPARATUS AND PROGRAM PRODUCT CORRECTING IMAGE BLUR CAUSED BY FLOATING PAPER TO INCREASE INSPECTION ACCURACY OF PRINTED IMAGE

(71) Applicant: FUJIFILM Business Innovation Corp., Tokyo (JP)

(72) Inventor: Toru Misaizu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/718,284

(22) Filed: Apr. 11, 2022

(65) Prior Publication Data
US 2023/0119800 A1    Apr. 20, 2023

(30) Foreign Application Priority Data

Oct. 15, 2021 (JP) .................. 2021-169929

(51) Int. Cl.
*H04N 1/00* (2006.01)
(52) U.S. Cl.
CPC ..... *H04N 1/00013* (2013.01); *H04N 1/00034* (2013.01); *H04N 1/00045* (2013.01); *H04N 1/00063* (2013.01); *H04N 1/00068* (2013.01); *H04N 1/00082* (2013.01); *H04N 1/00724* (2013.01); *H04N 1/00779* (2013.01); *H04N 1/00819* (2013.01)

(58) Field of Classification Search
CPC ........... H04N 1/00013; H04N 1/00034; H04N 1/00045; H04N 1/00063; H04N 1/00068; H04N 1/00082; H04N 1/00724; H04N 1/00779; H04N 1/00819
See application file for complete search history.

(56) References Cited

U.S. PATENT DOCUMENTS

| | | | | |
|---|---|---|---|---|
| 8,582,185 B2 * | 11/2013 | Ikeno | .................. | H04N 1/4092 358/488 |
| 9,350,892 B2 * | 5/2016 | Sano | .................... | G06T 3/0093 |
| 9,854,119 B2 * | 12/2017 | Aikawa | ................ | H04N 1/3876 |
| 2006/0119906 A1 * | 6/2006 | Park | .................. | H04N 1/00002 358/488 |

FOREIGN PATENT DOCUMENTS

JP          2014117841          6/2014

* cited by examiner

*Primary Examiner* — Scott A Rogers
(74) *Attorney, Agent, or Firm* — JCIPRNET

(57) ABSTRACT

An image inspection apparatus includes a processor configured to acquire printing data that is data as a base of an image to be printed, acquire read data that is data obtained by reading the image printed on a paper sheet, perform correction of a blur caused by floating of the paper sheet occurring in the reading of the image, on the read data, and inspect the image by comparing the printing data with the read data after the correction.

10 Claims, 11 Drawing Sheets

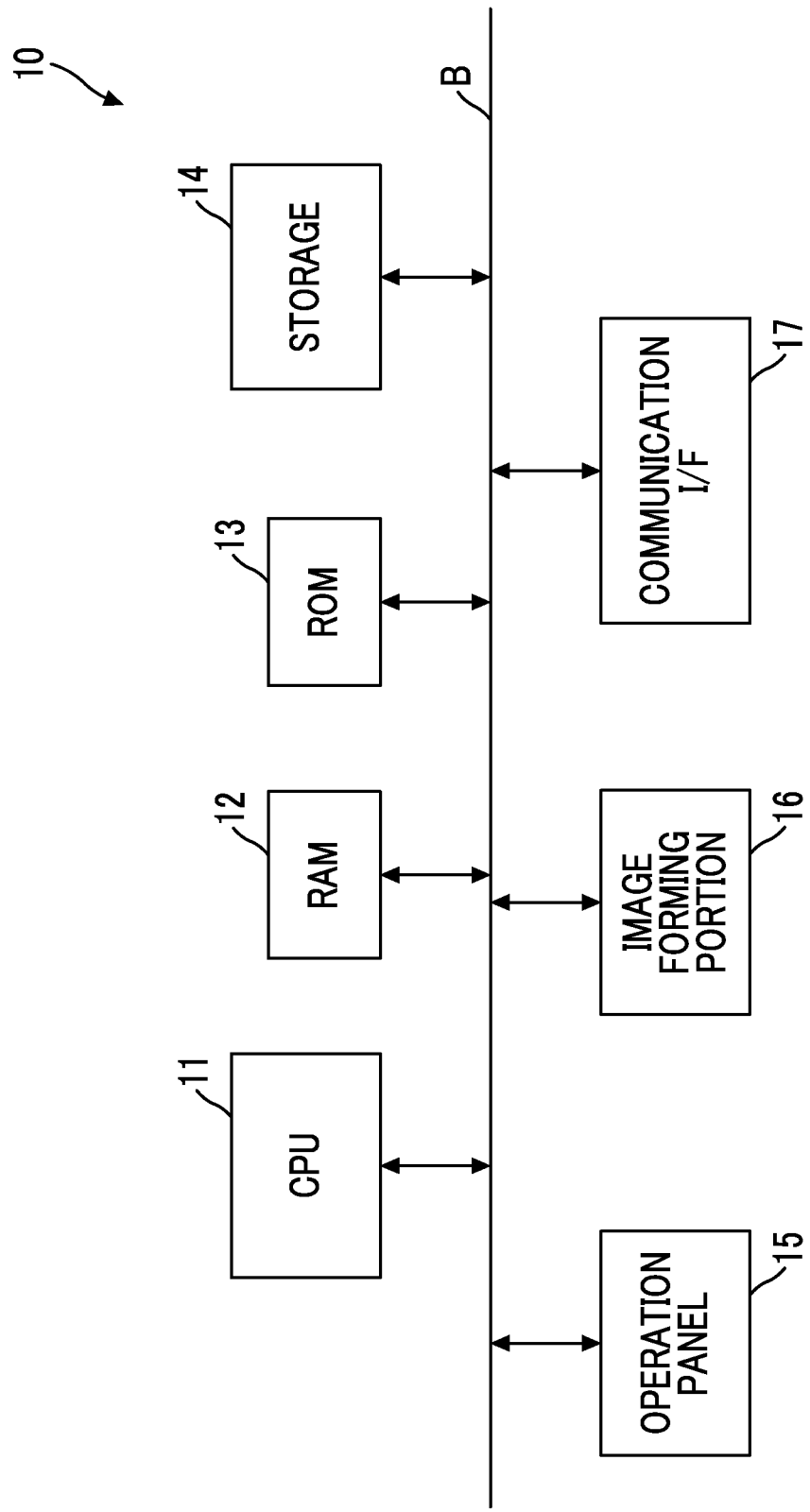

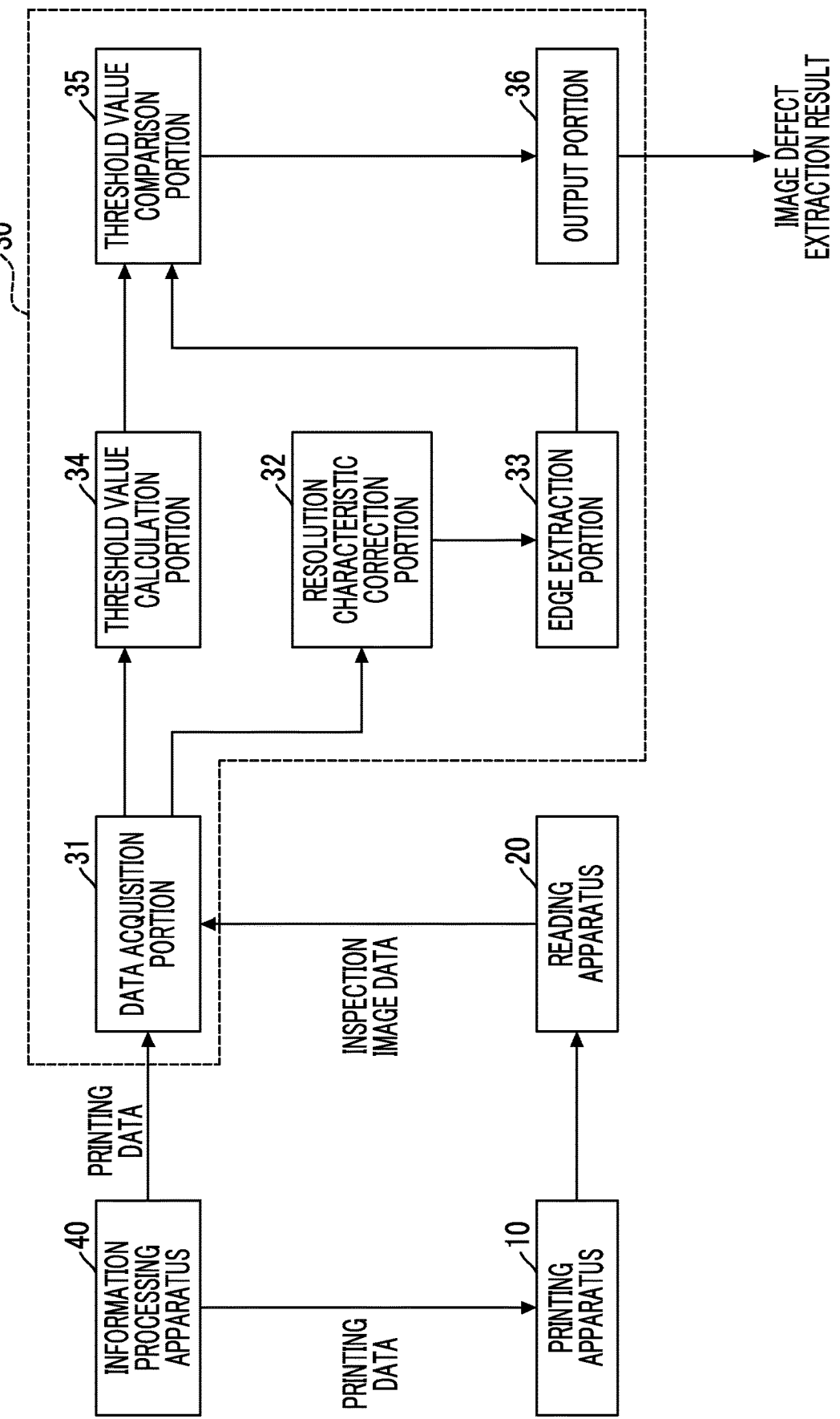

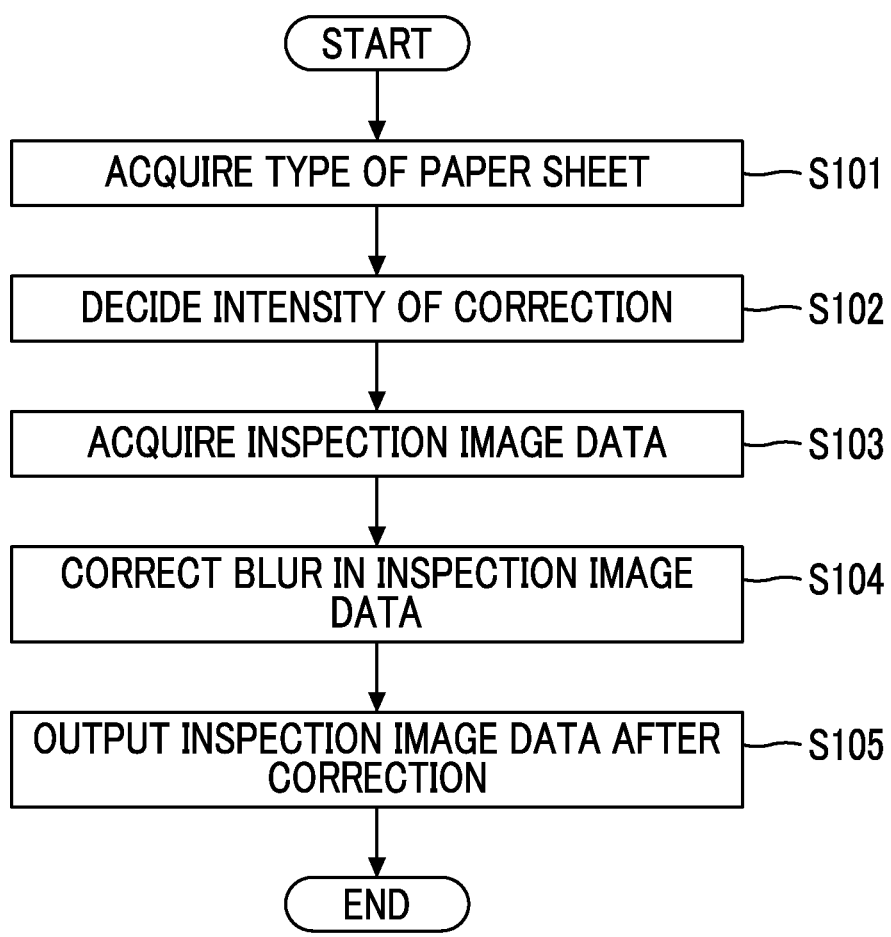

IMAGE INSPECTION APPARATUS AND PROGRAM PRODUCT CORRECTING IMAGE BLUR CAUSED BY FLOATING PAPER TO INCREASE INSPECTION ACCURACY OF PRINTED IMAGE

CROSS-REFERENCE TO RELATED APPLICATIONS

This application is based on and claims priority under 35 USC 119 from Japanese Patent Application No. 2021-169929 filed Oct. 15, 2021.

BACKGROUND

(i) Technical Field

The present invention relates to an image inspection apparatus, an image inspection system, and a non-transitory computer readable medium storing a program.

(ii) Related Art

In the related art, an image inspection apparatus that inspects a printed image by comparing printing data as a base of an image to be printed with read data obtained by reading the printed image has been used.

JP2014-117841A discloses an image inspection apparatus that inspects a printed image and includes a reception unit which receives printing data, a reading unit which reads a printed image obtained by printing the received printing data, and an image inspection unit which calculates image distortion by comparing the received printing data with the read printed image, generates distortion information including a position on a paper sheet and a magnitude and a direction of distortion based on the calculated image distortion, distorts the received printing data based on the distortion information, and compares the distorted printing data with the read printed image.

SUMMARY

In a case where the paper sheet on which the image is printed floats, the read image may blur, and inspection accuracy of the image may be decreased.

Aspects of non-limiting embodiments of the present disclosure relate to an image inspection apparatus, an image inspection system, and a non-transitory computer readable medium storing a program that are unlikely to receive an effect of floating even in a case where a paper sheet on which an image is printed floats.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image inspection apparatus including a processor configured to acquire printing data that is data as a base of an image to be printed, acquire read data that is data obtained by reading the image printed on a paper sheet, perform correction of a blur caused by floating of the paper sheet occurring in the reading of the image, on the read data, and inspect the image by comparing the printing data with the read data after the correction.

BRIEF DESCRIPTION OF THE DRAWINGS

Exemplary embodiment(s) of the present invention will be described in detail based on the following figures, wherein:

FIG. 2 is a diagram illustrating a hardware configuration example of a printing apparatus;

FIG. 4 is a diagram illustrating a processing flow performed in the image inspection system;

Figure 6:
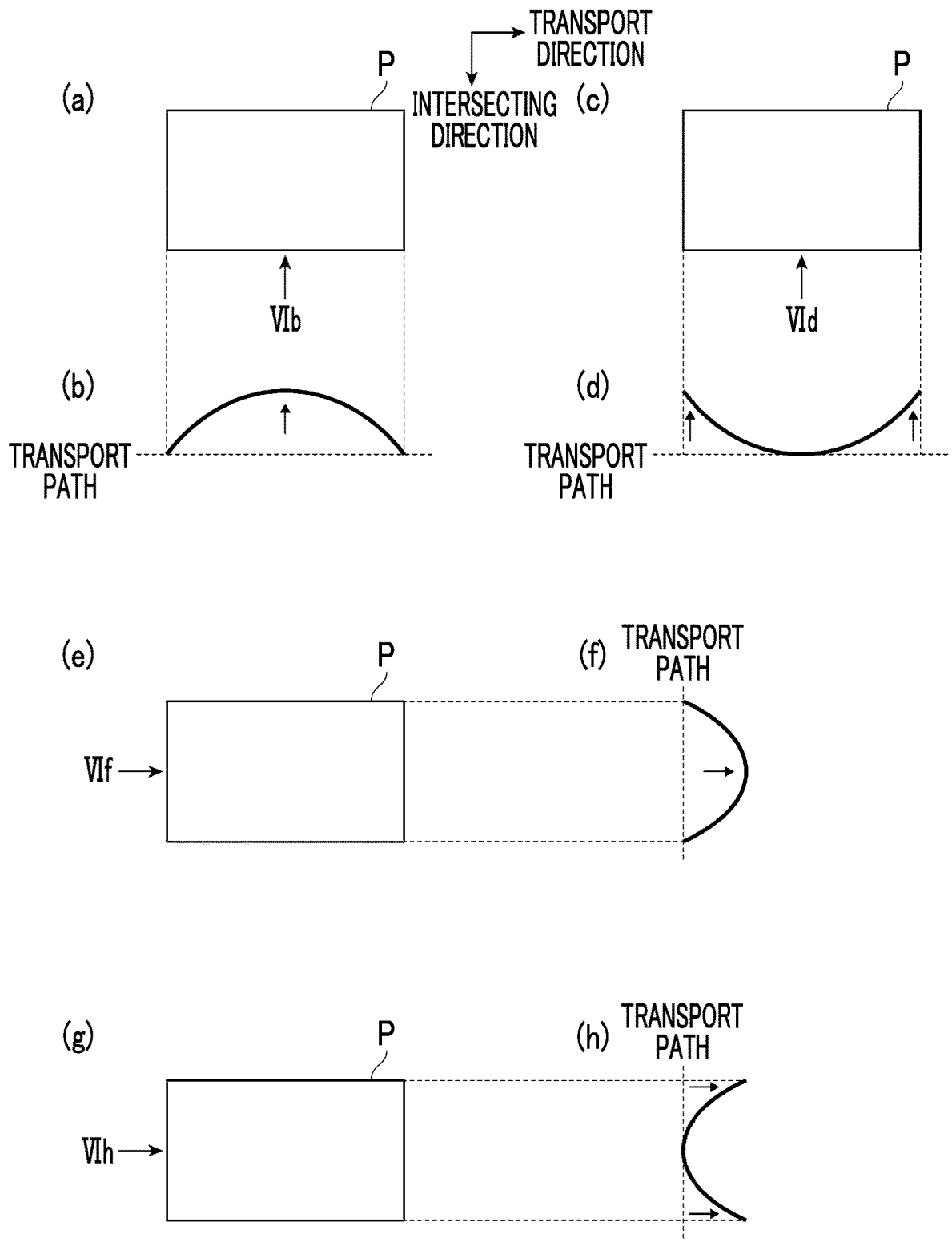
Figure 7:
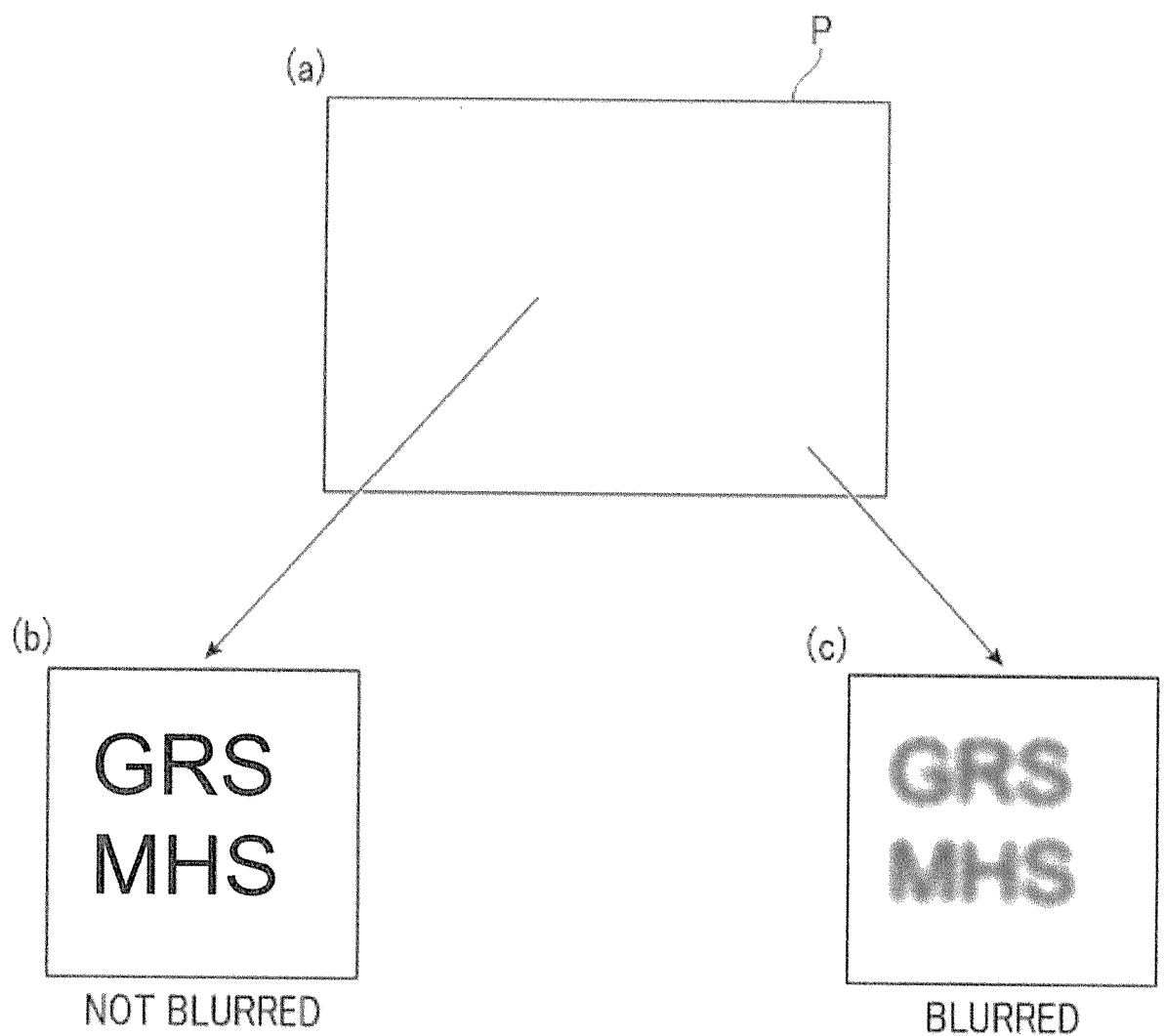
Figure 8:
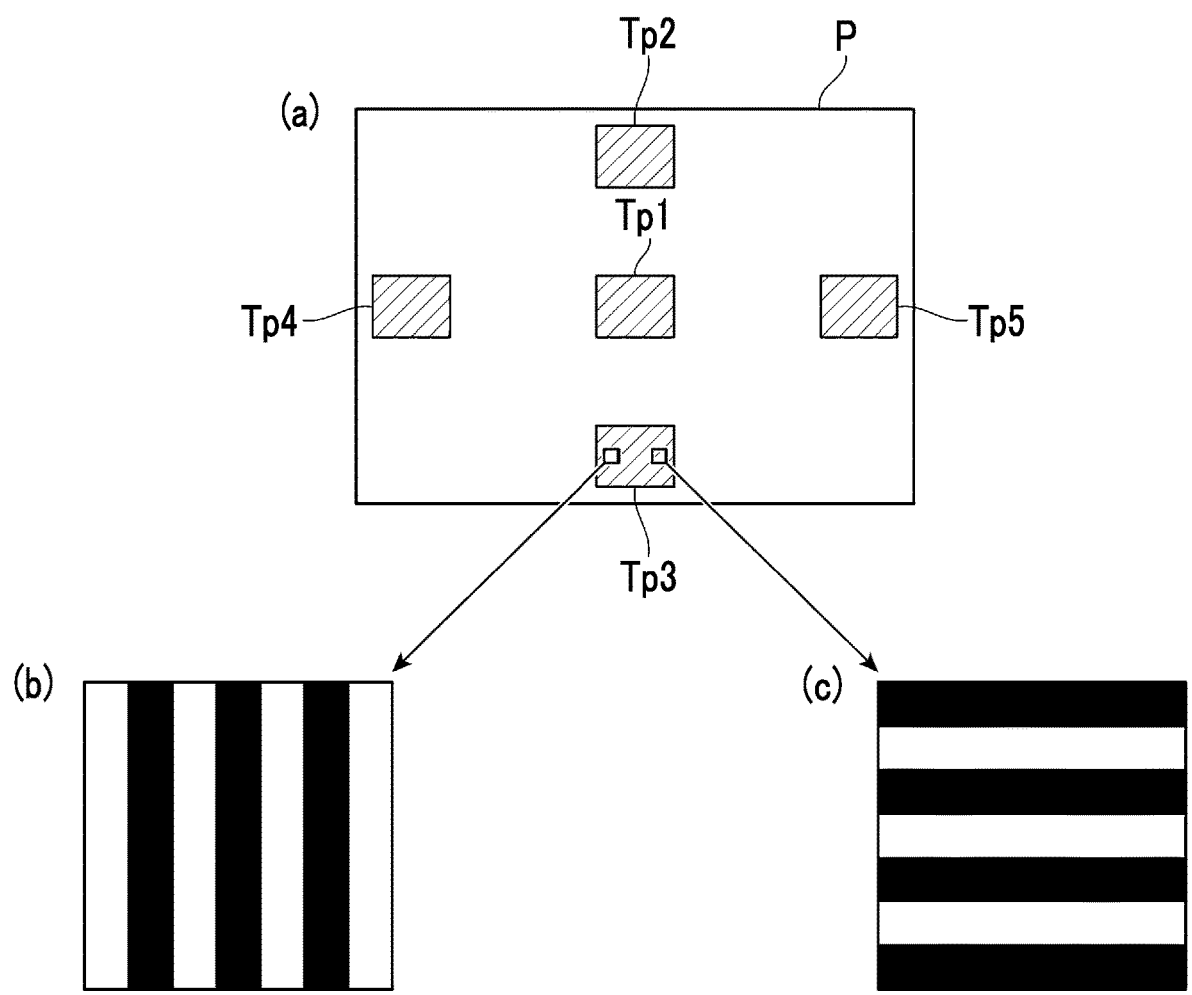
Figure 9A:
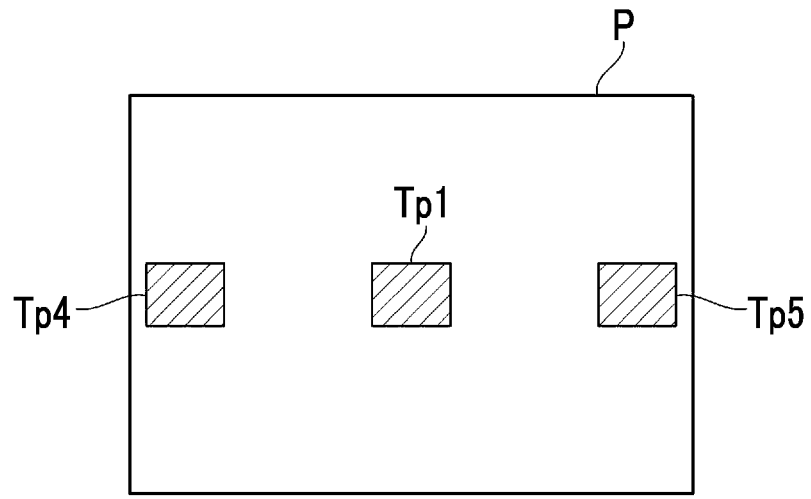
Figure 9B:
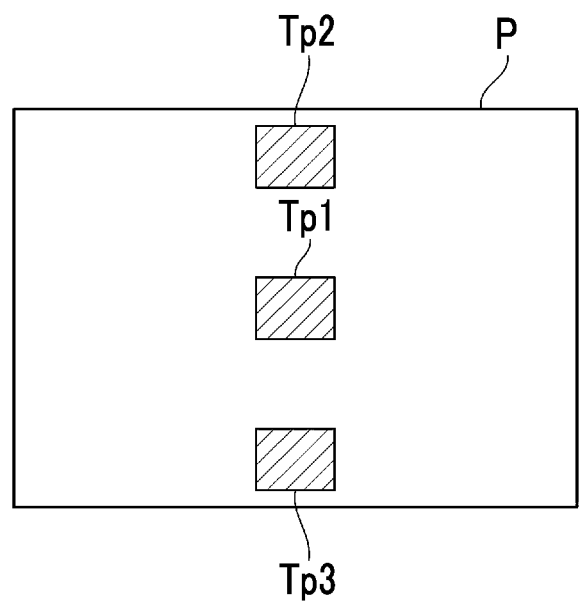
Figure 10A:
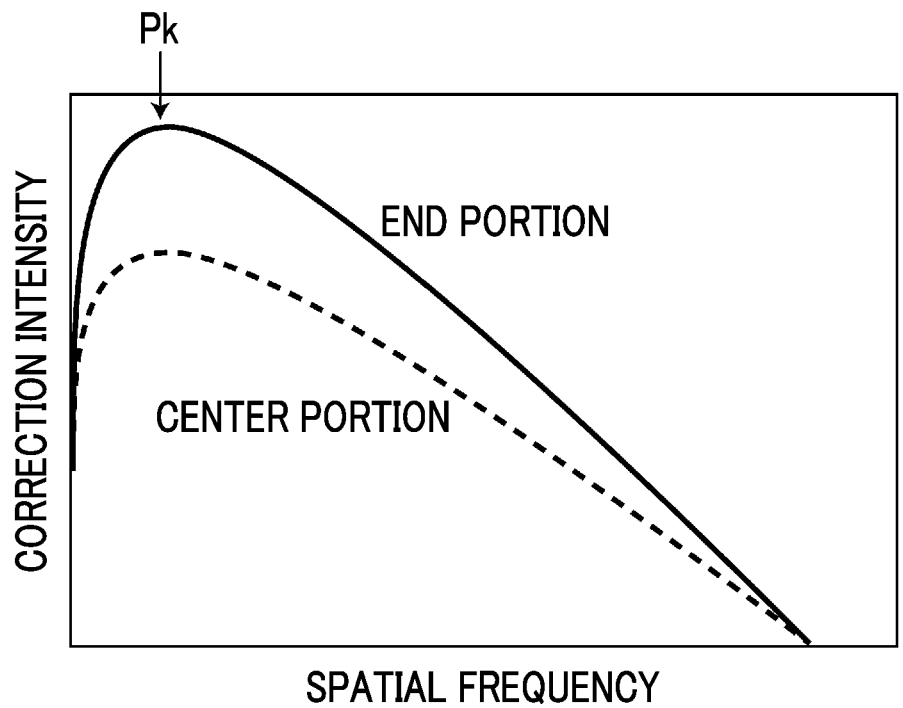
Figure 10B:
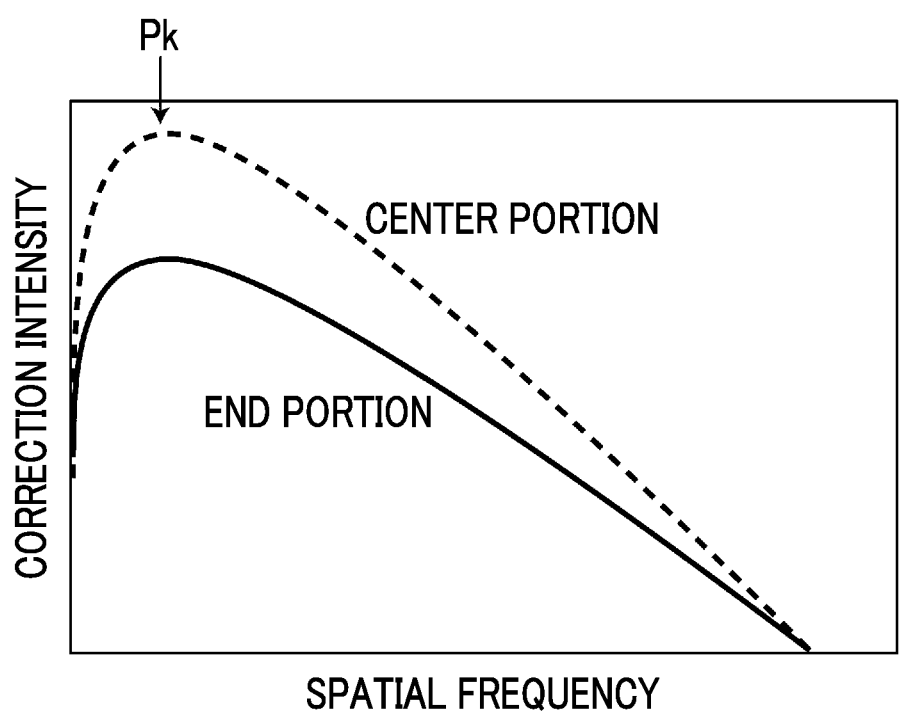

Parts (a) to (h) in FIG. 6 are diagrams illustrating floating of a paper sheet;

Parts (a) to (c) in FIG. 7 are diagrams illustrating a blur when a printed paper sheet is read;

Parts (a) to (c) in FIG. 8 are diagrams illustrating a test paper sheet for detecting which of four aspects of occurrence of the floating is applicable;

FIGS. 9A and 9B are diagrams illustrating other forms of the test paper sheet;

FIGS. 10A and 10B are diagrams illustrating a relationship between a spatial frequency of an image printed on a paper sheet P and intensity of correction; and FIG. 11 is a flowchart illustrating processing of the correction performed by a resolution characteristic correction portion.

DETAILED DESCRIPTION

Hereinafter, an exemplary embodiment of the present invention will be described in detail with reference to the accompanying drawings.

Overall Description of Image Inspection System

Figure 1:
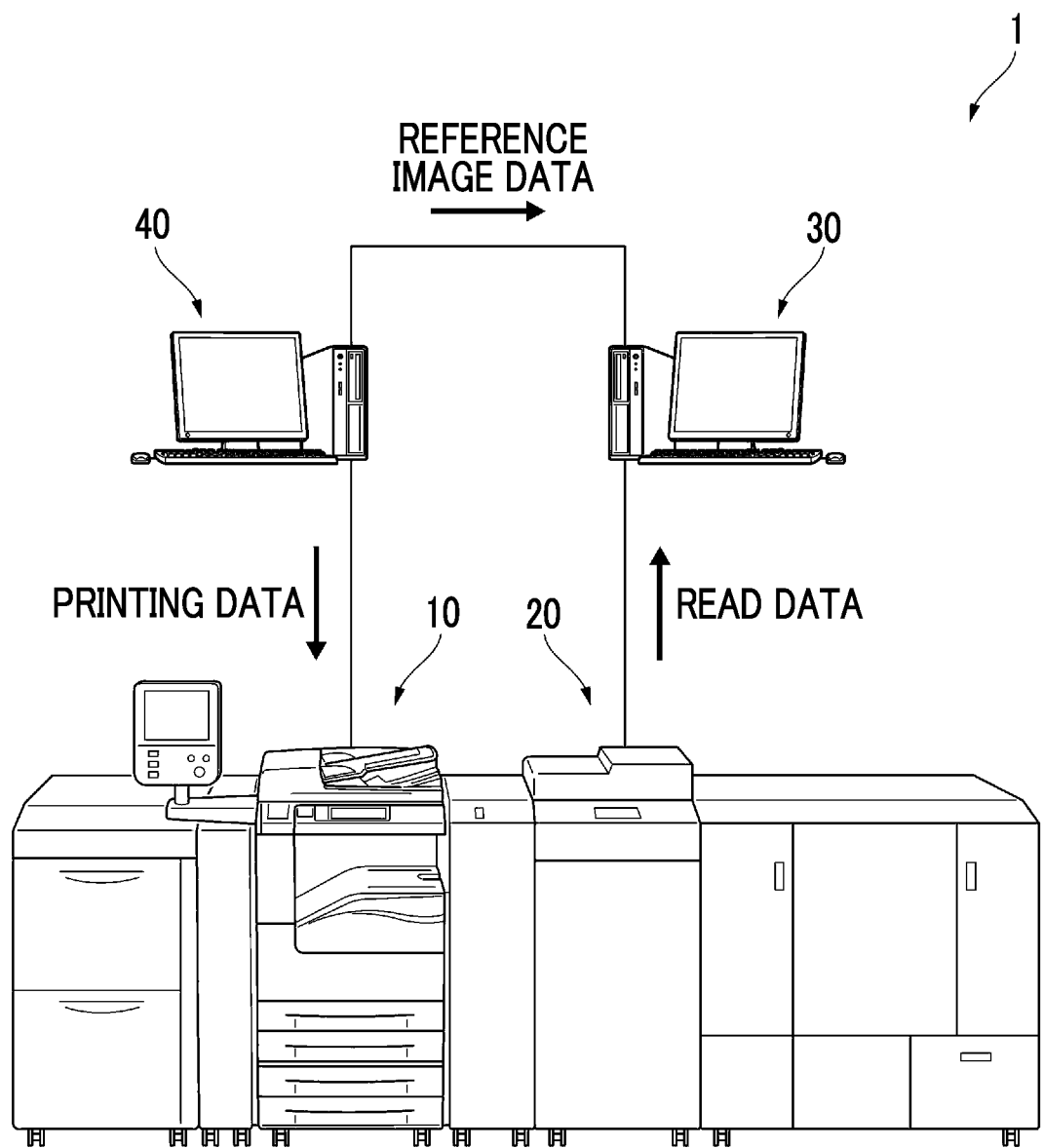
FIG. 1 is a diagram illustrating a configuration example of an image inspection system in a present exemplary embodiment.

FIG. 1 is a diagram illustrating a configuration example of an image inspection system 1 in the present exemplary embodiment.

As illustrated, the image inspection system 1 of the present exemplary embodiment includes a printing apparatus 10 that prints an image, a reading apparatus 20 that reads the printed image, an image inspection apparatus 30 that inspects the image, and an information processing apparatus 40 that creates printing data or color data for inspection.

The printing apparatus 10 is an apparatus that has a printer function of printing the image on a paper sheet which is a recording medium, and outputting the printed image as a printed document.

FIG. 2 is a diagram illustrating a hardware configuration example of the printing apparatus 10.

As illustrated, the printing apparatus 10 includes a CPU 11, a random access memory (RAM) 12, a read only memory (ROM) 13, a storage 14, an operation panel 15, an image forming portion 16, and a communication I/F 17. These components exchange necessary data through a bus B.

The CPU 11 implements each function, described later, by loading various programs stored in the ROM 13 or the like into the RAM 12 and executing the loaded various programs.

The RAM 12 is a memory used as a work memory or the like of the CPU 11.

The ROM 13 is a memory storing the various programs and the like executed by the CPU 11.

The storage 14 is a hard disk drive (HDD) or a solid state drive (SSD) and stores image information and the like used in the image forming portion 16.

The operation panel 15 is, for example, a touch panel that displays various information and receives an operation input from a user. In a case where the operation panel 15 is a touch panel, the operation panel 15 includes a display portion such as a liquid crystal panel that displays a content (information content) as an image in a predetermined region. In addition, the operation panel 15 has a function of sensing a position of contact of a contact object on the liquid crystal panel when the contact object represented by a finger of a person or a stylus pen comes into contact with the liquid crystal panel. In the present exemplary embodiment, the touch panel is not particularly limited, and touch panels of various types such as a resistive film type and an electrostatic capacitive type can be used.

The image forming portion 16 is an example of a printing mechanism that forms an image on a paper sheet. Here, the image forming portion 16 of an electrophotographic type that forms an image by transferring toner attached to a photoconductor to a paper sheet, or an ink jet type that forms an image by ejecting ink onto a paper sheet can be used.

The communication I/F 17 transmits and receives various information to and from other apparatuses.

The reading apparatus 20 reads the image printed on the paper sheet by the printing apparatus 10. The reading apparatus 20 is a so-called inline sensor and reads the image printed on the paper sheet that is being transported.

Figure 3A:
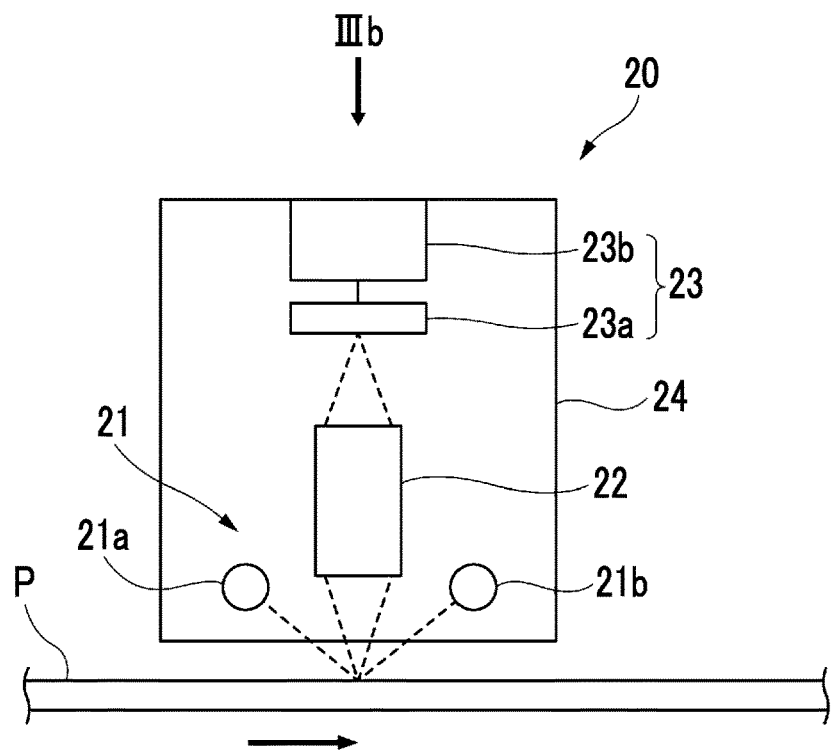
FIGS. 3A and 3B are diagrams for describing a reading apparatus.
Figure 3B:
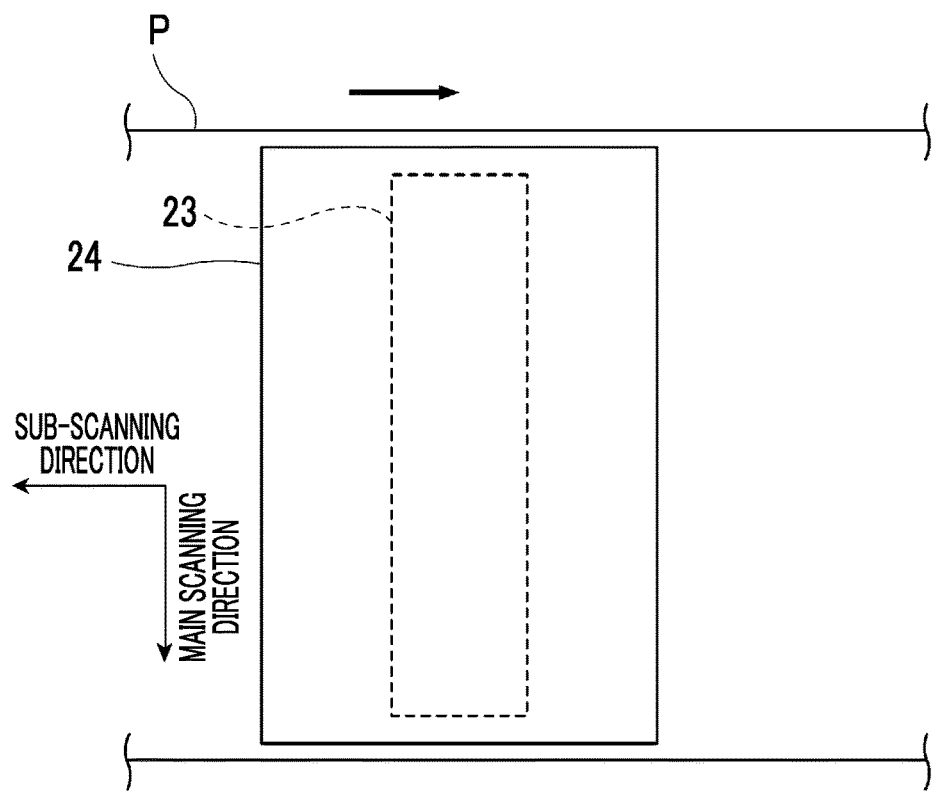

FIGS. 3A and 3B are diagrams for describing the reading apparatus 20. Here, FIG. 3A is a diagram when the reading apparatus 20 is seen from the same direction as FIG. 1. In addition, FIG. 3B is a diagram when the reading apparatus 20 is seen from a direction IIIb in FIG. 3A.

As illustrated, the reading apparatus 20 includes a light source 21, an optical system 22, a charge coupled device (CCD) sensor 23, and a housing 24.

The light source 21 irradiates a paper sheet P on which the image is formed, with light. For example, the light source 21 is configured with a pair of tungsten lamps 21a and 21b. Reflected light including information about the image is generated by irradiating the image formed on the paper sheet P with light.

The optical system 22 guides the light reflected by the image formed on the paper sheet P to the CCD sensor 23. In the present exemplary embodiment, the optical system 22 consists of a SELFOC display (SLA: registered trademark). This SELFOC display generally condenses diffuse reflected light out of the reflected light from the image and forms an image of the condensed diffuse reflected light on the CCD sensor 23.

The CCD sensor 23 receives the light guided by the optical system 22. CCDs 23a as pixels receiving the light reflected by the image are arranged in a line in the CCD sensor 23. In the present exemplary embodiment, CCDs corresponding to colors of red (R), green (G), and blue (B), respectively, are arranged in three arrays, and the image can be measured with each color of RGB. That is, the CCDs 23a are 3-line color CCDs. The CCDs 23a are arranged in a main scanning direction for each color of RGB. That is, accordingly, the image can be read in the main scanning direction. In addition, the paper sheet moves in a sub-scanning direction in accordance with the transport of the paper sheet. Accordingly, the image can be read in the sub-scanning direction. The light received by the CCDs 23a is photoelectrically converted into charges, and these charges are transferred to a read data generation portion 23b.

In the read data generation portion 23b, the charges transferred from the CCDs 23a are sensed as a sensing signal. This sensing signal is read data obtained by reading the image formed on the paper sheet. Since the CCDs 23a are color CCDs of three colors of R, G, and B, an R signal, a G signal, and a B signal are generated as read data corresponding to each color in the read data generation portion 23b.

The housing 24 is a case for accommodating the light source 21, the optical system 22, and the CCD sensor 23.

The image inspection apparatus 30 inspects the image read by the reading apparatus 20. The image inspection apparatus 30 acquires the printing data that is data as a base of the image to be printed, from the information processing apparatus 40. In addition, the image inspection apparatus 30 acquires the read data from the read data generation portion 23b of the reading apparatus 20. The image is inspected by comparing the printing data with the read data. This matter will be described in detail later.

The information processing apparatus 40 creates the printing data. This matter will also be described in detail later.

The image inspection apparatus 30 and the information processing apparatus 40 are computer apparatuses. The image inspection apparatus 30 and the information processing apparatus 40 each perform processing by operating various application software under management of an operating system (OS). The image inspection apparatus 30 and the information processing apparatus 40 include a central processing unit (CPU) that is a calculation unit, a main memory that is a storage unit, and a storage such as an HDD or an SSD. Here, the CPU executes various programs such as the OS and application software. In addition, the main memory is a storage region storing the various programs, data used for executing the various programs, and the like. The storage is a storage region storing input data for the various programs, output data from the various programs, and the like. Furthermore, the image inspection apparatus 30 and the information processing apparatus 40 include a communication interface for external communication. Here, the CPU is an example of a processor.

FIG. 4 is a diagram illustrating a processing flow performed in the image inspection system 1.

As illustrated, in the image inspection system 1, the information processing apparatus 40 creates the printing data for printing by the printing apparatus 10. This printing data is raster image processor (RIP) data and is color data based on color of a coloring material such as toner used in the printing apparatus 10. In the present exemplary embodiment, cyan (C), magenta (M), yellow (Y), and black (K) are used as the color of the coloring material.

In the printing apparatus 10, printing is performed on the paper sheet based on the printing data.

The printed paper sheet is transported, and the reading apparatus 20 reads the printed image. The read data read by the reading apparatus 20 is transmitted to the image inspection apparatus 30 as inspection image data.

In the image inspection apparatus 30, a data acquisition portion 31 acquires the printing data that is created by the information processing apparatus 40 and is data as the base of the image to be printed. In addition, the data acquisition portion 31 acquires the inspection image data as the read data that is transmitted from the reading apparatus 20 and is data obtained by reading the image printed on the paper sheet. In addition, at this point, the image based on the printing data and the image based on the inspection image data are registered. A resolution characteristic correction portion 32 corrects a resolution characteristic of the inspection image data. In this case, a blur that occurs in the reading of the image by the reading apparatus 20 is corrected. Next, an edge extraction portion 33 extracts an image part by performing edge extraction. A difference between the printing data and the inspection image data is calculated. In addition, a threshold value calculation portion 34 calculates a threshold value for determining an image defect based on the printing data. This threshold value is used for determining that the image defect is not present in a case where the difference between the printing data and the inspection image data is less than or equal to the threshold value, and determining that the image defect is present in a case where the difference exceeds the threshold value. A threshold value comparison portion 35 compares the difference between the printing data and the inspection image data with the threshold value, and an output portion 36 outputs an image defect extraction result. Accordingly, whether or not the image defect is present in the image printed by the printing apparatus 10 can be detected. For example, this image defect is present in a case where dust is attached to the paper sheet, or a case where a dot, a streak, or the like that is originally not present occurs in the image. That is, in the image inspection apparatus 30, the image is inspected by comparing the printing data with the inspection image data after the correction.

At this point, the inspection image data that is the read data transmitted from the reading apparatus 20 is RGB data. In addition, the printing data transmitted from the information processing apparatus 40 is converted into RGB data by an RGB conversion portion 49, described later, in FIG. 5. In the image inspection apparatus 30, the image is inspected by comparing the printing data with the inspection image data after the correction in the same color space of an RGB color space. The inspection image data transmitted from the reading apparatus 20 may be converted from RGB data into L*a*b* data in the image inspection apparatus 30. In this case, in the information processing apparatus 40, the conversion is performed into L*a*b* data instead of RGB data. Furthermore, in the image inspection apparatus 30, the printing data is acquired as L*a*b* data. In the image inspection apparatus 30, the image is inspected by comparing the printing data with the inspection image data after the correction in the same color space of an L*a*b* color space.

Description of Information Processing Apparatus 40

Next, processing performed in the information processing apparatus 40 will be described in detail.

Figure 5:
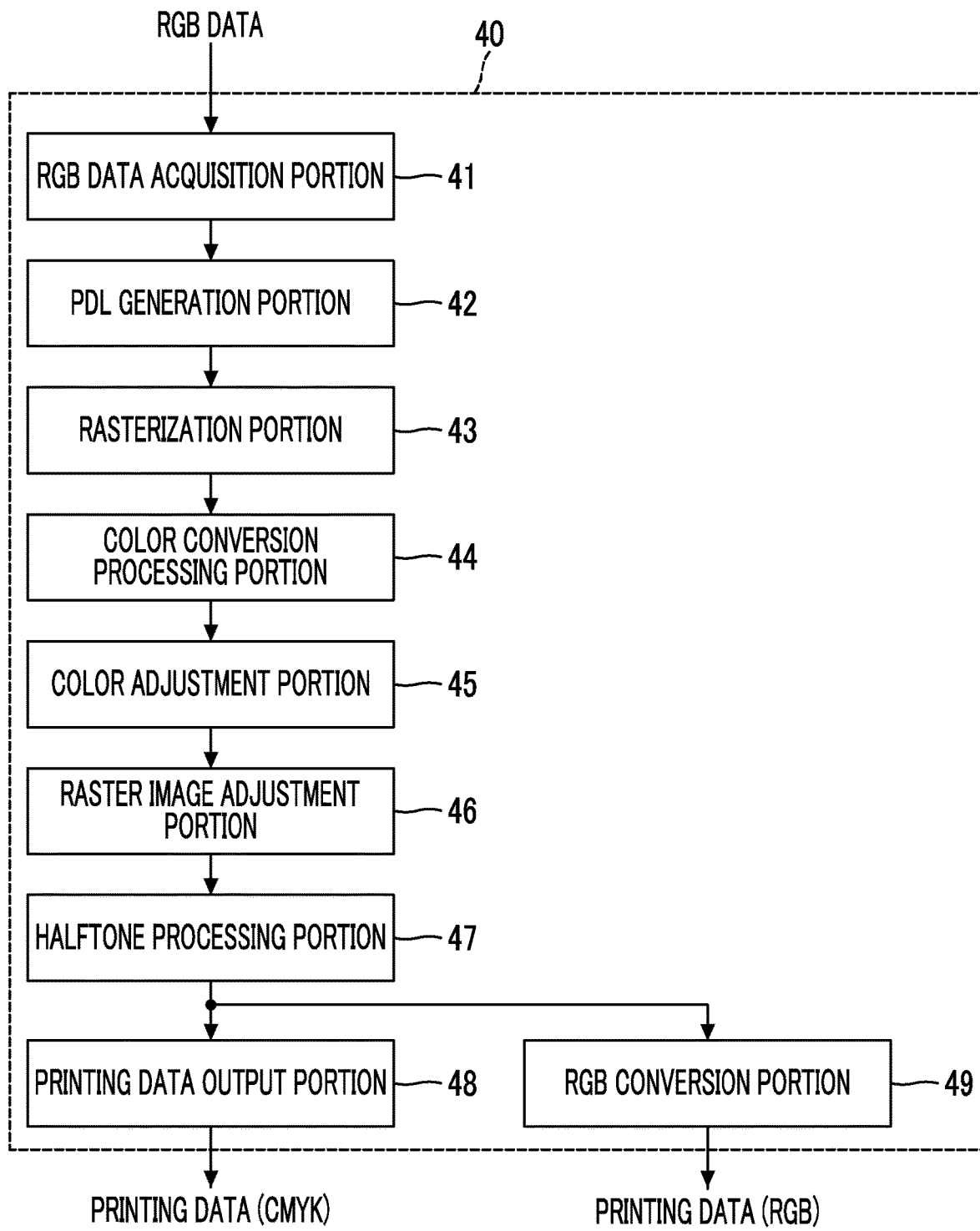
FIG. 5 is a block diagram illustrating a signal processing system in an information processing apparatus.

FIG. 5 is a block diagram illustrating a signal processing system in the information processing apparatus 40.

The information processing apparatus 40 includes an RGB data acquisition portion 41 that acquires RGB data created for outputting the image by the printing apparatus 10, a PDL generation portion 42 that receives red, green, and blue (RGB) data and converts the RGB data into a page description language (PDL), a rasterization portion 43 that creates a raster image from the PDL generated by the PDL generation portion 42, a color conversion processing portion 44 that converts the RGB data into CMYK data, a color adjustment portion 45 that adjusts color of the CMYK data, a raster image adjustment portion 46 that adjusts the raster image converted by the color adjustment portion 45, a halftone processing portion 47 that performs halftone processing, a printing data output portion 48 that outputs the printing data after signal processing to the printing apparatus 10, and the RGB conversion portion 49 that converts the CMYK data into RGB data.

In the present exemplary embodiment, first, the RGB data acquisition portion 41 receives RGB data from an external PC. This RGB data is image data that a user using the PC intends to print by the printing apparatus 10.

The RGB data is transmitted to the PDL generation portion 42. The PDL generation portion 42 converts the RGB data into code data described in PDL and outputs the code data.

The rasterization portion 43 converts the code data that is output from the PDL generation portion 42 and is described in PDL, into raster data for each pixel as a raster image.

The color conversion processing portion 44 converts the raster data input from the rasterization portion 43 into CMYK data that is reproduction color (CMYK is color of toner which is a coloring material) of the printing apparatus 10, and outputs the CMYK data. This CMYK data consists of C color data, M color data, Y color data, and K color data separated for each color.

The color adjustment portion 45 functions as a color adjustment unit that adjusts color of the image to be formed by the printing apparatus 10. The color adjustment portion 45 adjusts the color of the CMYK data to target color that is to be originally output by the printing apparatus 10.

The raster image adjustment portion 46 performs various adjustments for obtaining more favorable image quality by the printing apparatus 10, by performing γ conversion, definition processing, middle tone processing, or the like on the CMYK data output from the color adjustment portion 45.

The halftone processing portion 47 performs halftone processing on the printing data by performing dither mask processing using a dither mask having predetermined threshold value arrays in the main scanning direction and the sub-scanning direction. Accordingly, for example, the printing data is changed from printing data represented by multiple values to printing data represented by two values.

The printing data output portion 48 outputs the printing data created by the halftone processing portion 47 to the printing apparatus 10. This printing data is CMYK data.

The RGB conversion portion 49 converts the CMYK data output from the halftone processing portion 47 into RGB data again. The printing data changed to the RGB data is output to the image inspection apparatus 30.

Description of Resolution Characteristic Correction Portion 32

Next, a method of correcting the blur occurring in the read image by the resolution characteristic correction portion 32 of the image inspection apparatus 30 will be described in detail.

A reason for the occurrence of the blur in the read image in the present exemplary embodiment is because of occurrence of floating of the paper sheet. That is, the optical system 22 of the reading apparatus 20 is focused on a location of a transport path on which the paper sheet is transported. Thus, in a case where the paper sheet is at a position deviating from this transport path, the optical system 22 is not focused, and the blur occurs. General factors for the deviation of the paper sheet from the transport path include occurrence of the floating of the paper sheet.

Parts (a) to (h) in FIG. 6 are diagrams illustrating floating of the paper sheet P.

In the present exemplary embodiment, there are generally four aspects of occurrence of the floating of the paper sheet P. These four aspects of the floating are illustrated in the parts (a) to (h) in FIG. 6. In the parts (a) to (h) in FIG. 6, a dotted line illustrates a position of the transport path. Furthermore, an arrow in the parts (b), (d), (f), and (h) in FIG. 6 illustrates a location and a direction in which the paper sheet P floats.

The parts (a) and (b) in FIG. 6 are cases where the floating occurs in a center portion in a transport direction (sub-scanning direction) of the paper sheet P. In this case, the part (b) in FIG. 6 is a diagram of the paper sheet P seen from a direction VIb in the part (a) in FIG. 6. In this case, two edges that are short edges of the paper sheet P have straight linear shapes and are positioned on the transport path. Meanwhile, two edges that are long edges of the paper sheet P float up to have a convex shape and are positioned higher than the transport path. In this case, a part near the center portion along a long edge direction of the paper sheet P is positioned highest.

In addition, the parts (c) and (d) in FIG. 6 are cases where the floating occurs in an end portion in the transport direction (sub-scanning direction) of the paper sheet P. In this case, the part (d) in FIG. 6 is a diagram of the paper sheet P seen from a direction VId in the part (c) in FIG. 6. In this case, the two short edges of the paper sheet P float up and are positioned highest. In addition, two edges that are the long edges of the paper sheet P float up to have a concave shape. The center portion along the short edges of the paper sheet P is on the transport path.

Furthermore, the parts (e) and (f) in FIG. 6 are cases where the floating occurs in the center portion in a direction (main scanning direction) intersecting with the transport direction of the paper sheet P. In this case, the part (f) in FIG. 6 is a diagram of the paper sheet P seen from a direction VIf in the part (e) in FIG. 6. In this case, two edges that are the long edges of the paper sheet P have straight linear shapes and are positioned on the transport path. Meanwhile, two edges that are the short edges of the paper sheet P float up to have a convex shape and are positioned higher than the transport path. In this case, a part near the center portion along a short edge direction of the paper sheet P is positioned highest.

Furthermore, the parts (g) and (h) in FIG. 6 are cases where the floating occurs in an end portion in the direction (main scanning direction) intersecting with the transport direction of the paper sheet P. In this case, the part (h) in FIG. 6 is a diagram of the paper sheet P seen from a direction VIh in the part (g) in FIG. 6. In this case, the two long edges of the paper sheet P float up and are positioned highest. In addition, two edges that are the short edges of the paper sheet P float up to have a concave shape. The center portion along the long edges of the paper sheet P is on the transport path.

Parts (a) to (c) in FIG. 7 are diagrams illustrating a blur when the printed paper sheet P is read.

In this case, a case where the floating illustrated in the parts (c) and (d) in FIG. 6 occurs is illustrated. In this case, the center portion of the paper sheet P illustrated in the part (a) in FIG. 7 is positioned on the transport path or close to the transport path, and the blur does not occur as illustrated in the part (b) in FIG. 7. On the other hand, as illustrated in the part (c) in FIG. 7, the floating occurs, and the blur occurs on the short edge side of the paper sheet P.

In this case, a curl can be said to occur along the short edge direction or the long edge direction of the paper sheet P. In a case where the floating (curl) occurs as such, the blur occurs when a location positioned higher or lower than the transport path is read. Which of the four aspects is applicable is determined by a type of paper sheet P. The type of paper sheet P is not particularly limited and can be categorized by, for example, a manufacturer of the paper sheet P, a model number of the paper sheet P, a size of the paper sheet P, or a basis weight of the paper sheet P.

Therefore, in the present exemplary embodiment, in the resolution characteristic correction portion 32, the blur caused by the floating of the paper sheet P occurring in the reading of the image is corrected for the read data in accordance with the four aspects. The correction of the blur is performed based on sharpness. That is, correction of highlighting contours of a text or the like is performed.

Which of the four aspects is applicable is decided by the type of paper sheet P. Thus, which of the four floatings occurs is measured in advance for each type of paper sheet P. Accordingly, since which aspect of the floating occurs is already known for each type of paper sheet P to be used for printing, the blur is corrected in accordance with the aspect. That is, the correction of the blur is set in advance for each type of paper sheet P. The correction is set for each type of paper sheet P such that the paper sheet P floats along any one direction of the transport direction (sub-scanning direction) and the direction (main scanning direction) intersecting with the transport direction.

Parts (a) to (c) in FIG. 8 are diagrams illustrating a test paper sheet T for detecting which of the four aspects of occurrence of the floating is applicable.

In the present exemplary embodiment, for each type of paper sheet P, the correction is set by reading a test pattern Tp printed in a center portion and both end portions of the test paper sheet T.

The part (a) in FIG. 8 illustrates a case where the test pattern Tp is arranged in total five locations including one location of the center portion of the test paper sheet T, two locations positioned on two short edge sides, and two locations positioned on two long edge sides. That is, the test pattern Tp is printed in the center portion, both end portions on the long edge side, and both end portions on the short edge side of the test paper sheet T. The test pattern Tp in one location of the center portion of the test paper sheet T is denoted by a test pattern Tp1. The test pattern Tp in two locations positioned on the two short edge sides are denoted by test patterns Tp2 and Tp3. The test pattern Tp in two locations positioned on the two long edge sides are denoted by test patterns Tp4 and Tp5.

The parts (b) and (c) in FIG. 8 are diagrams of the enlarged test pattern Tp. Each of the test patterns Tp1 to Tp5 is a pattern having the same configuration. For example, the test patterns Tp1 to Tp5 are configured with ladder patterns striped in the transport direction and the direction intersecting with the transport direction.

Which of the four aspects is applicable for the floating of the paper sheet P can be detected by reading, by the reading apparatus 20, the test paper sheet T obtained by printing the test patterns Tp1 to Tp5 on the paper sheet P by the printing apparatus 10 in the part (a) in FIG. 8.

That is, in a case where the floating illustrated in the parts (a) and (b) in FIG. 6 occurs, the test patterns Tp4 and Tp5 are positioned on the transport path or close to the transport path. Thus, the blur does not occur in the test patterns Tp4 and Tp5. Meanwhile, the test patterns Tp1, Tp2, and Tp3 are positioned away from the transport path. Thus, the blur occurs in the test patterns Tp1, Tp2, and Tp3.

In addition, in a case where the floating illustrated in the parts (c) and (d) in FIG. 6 occurs, the test patterns Tp1, Tp2, and Tp3 are positioned on the transport path or close to the transport path. Thus, the blur does not occur in the test patterns Tp1, Tp2, and Tp3. Meanwhile, the test patterns Tp4 and Tp5 are positioned away from the transport path. Thus, the blur occurs in the test patterns Tp4 and Tp5.

Furthermore, in a case where the floating illustrated in the parts (e) and (f) in FIG. 6 occurs, the test patterns Tp2 and Tp3 are positioned on the transport path or close to the transport path. Thus, the blur does not occur in the test patterns Tp2 and Tp3. Meanwhile, the test patterns Tp1, Tp4, and Tp5 are positioned away from the transport path. Thus, the blur occurs in the test patterns Tp1, Tp4, and Tp5.

Furthermore, in a case where the floating illustrated in the parts (g) and (h) in FIG. 6 occurs, the test patterns Tp1, Tp4, and Tp5 are positioned on the transport path or close to the transport path. Thus, the blur does not occur in the test patterns Tp1, Tp4, and Tp5. Meanwhile, the test patterns Tp2 and Tp3 are positioned away from the transport path. Thus, the blur occurs in the test patterns Tp2 and Tp3.

Thus, which of the four aspects of occurrence of the floating is applicable can be detected depending on which test pattern Tp blurs.

The test paper sheet T is not limited to the case illustrated in FIG. 8.

FIGS. 9A and 9B are diagrams illustrating other forms of the test paper sheet T.

FIG. 9A is a case where the test paper sheet T is configured with three test patterns Tp of the test patterns Tp1, Tp4, and Tp5 compared to the test paper sheet T illustrated in FIG. 8. This test paper sheet T may be used in a case where the floating of the paper sheet P occurs in the aspects of the parts (a) and (b) and the parts (c) and (d) in FIG. 6 and does not occur in the aspects of the parts (e) and (f) and the parts (g) and (h) in FIG. 6.

Furthermore, FIG. 9B is a case where the test paper sheet T is configured with three test patterns Tp of the test patterns Tp1, Tp2, and Tp3 compared to the test paper sheet T illustrated in FIG. 8. This test paper sheet T may be used in a case where the floating of the paper sheet P occurs in the aspects of the parts (e) and (f) and the parts (g) and (h) in FIG. 6 and does not occur in the aspects of the parts (a) and (b) and the parts (c) and (d) in FIG. 6.

Next, a further specific method of correction by the resolution characteristic correction portion 32 will be described.

Intensity of the correction performed by the resolution characteristic correction portion 32 is changed between the center portion and the end portion of the paper sheet P. More specifically, the intensity of the correction is changed between the center portion and the end portion on any one of the long edge side or the short edge side of the paper sheet P and is not changed between the center portion and the end portion on the other.

That is, in the case of the parts (a) and (b) in FIG. 6, in the center portion and the end portion on the short edge side of the paper sheet P, since approximately the same degree of blur occurs, the same intensity of the correction is set without change. In the end portion on the long edge side of the paper sheet P, since the blur does not occur, the correction is not performed. Furthermore, the intensity of the correction between the center portion and the end portion on the long edge side of the paper sheet P is obtained by interpolation.

In addition, in the case of the parts (c) and (d) in FIG. 6, in the center portion and the end portion on the short edge side of the paper sheet P, since the blur does not occur, the correction is not performed. That is, the same intensity of the correction is set. In the end portion on the long edge side of the paper sheet P, since the blur occurs, the correction is performed. Furthermore, the intensity of the correction between the center portion and the end portion on the long edge side of the paper sheet P is obtained by interpolation.

Furthermore, in the case of the parts (e) and (f) in FIG. 6, in the center portion and the end portion on the long edge side of the paper sheet P, since approximately the same degree of blur occurs, the same intensity of the correction is set without change. In the end portion on the short edge side of the paper sheet P, since the blur does not occur, the correction is not performed. Furthermore, the intensity of the correction between the center portion and the end portion on the short edge side of the paper sheet P is obtained by interpolation.

Furthermore, in the case of the parts (g) and (h) in FIG. 6, in the center portion and the end portion on the long edge side of the paper sheet P, since the blur does not occur, the correction is not performed. That is, the same intensity of the correction is set. In the end portion on the short edge side of the paper sheet P, since the blur occurs, the correction is performed. Furthermore, the intensity of the correction between the center portion and the end portion on the short edge side of the paper sheet P is obtained by interpolation.

In addition, the intensity of the correction is further decided in accordance with a spatial frequency of the image formed on the paper sheet P.

FIGS. 10A and 10B are diagrams illustrating a relationship between the spatial frequency of the image printed on the paper sheet P and the intensity of the correction. Here, a horizontal axis denotes the spatial frequency of the image, and a vertical axis denotes the intensity of the correction.

FIG. 10A illustrates a case where the blur does not occur in the center portion of the paper sheet P, and the blur occurs in the end portion on the long edge or the end portion on the short edge of the paper sheet P.

As illustrated, the relationship between the spatial frequency and the intensity of the correction is a function that has a peak Pk and is convex upward. The intensity of the correction is increased within a range of a lower spatial frequency and is decreased within a range of a higher spatial frequency with the peak Pk as a boundary between the ranges. That is, the intensity of the correction has a range in which the intensity of the correction is decreased as the spatial frequency is increased. In the range of the lower spatial frequency, an effect of the blur is unlikely to be received. In addition, in the range of the higher spatial frequency, even in a case where the blur occurs, the blur is unlikely to be visually recognized. Thus, the intensity of the correction is increased within a range of the spatial frequency in which the effect of the blur is likely to be received, and the blur is likely to be visually recognized. The intensity of the correction is decreased in a direction away from the range.

In addition, in the end portion in which the blur occurs, the intensity of the correction is increased as illustrated by a solid line. In the center portion in which the blur does not occur, the intensity of the correction is decreased as illustrated by a dotted line. That is, the intensity of the correction is set in accordance with the degree of blur.

FIG. 10B illustrates a case where the blur occurs in the center portion of the paper sheet P, and the blur does not occur in the end portion on the long edge or the end portion on the short edge of the paper sheet P.

In FIG. 10B, as in FIG. 10A, the relationship between the spatial frequency and the intensity of the correction is a function that has the peak Pk and is convex upward. On the other hand, in the end portion in which the blur does not occur, the intensity of the correction is decreased as illustrated by a solid line. In the center portion in which the blur occurs, the intensity of the correction is increased as illustrated by a dotted line. That is, the intensity of the correction is set in accordance with the degree of blur.

FIG. 11 is a flowchart illustrating processing of the correction performed by the resolution characteristic correction portion 32.

First, the resolution characteristic correction portion 32 acquires the type of paper sheet (step S101). The type of paper sheet can be acquired from a printing condition or the like.

Next, the resolution characteristic correction portion 32 decides the intensity of the correction in the center portion and the end portion of the paper sheet P based on the type of paper sheet (step S102). That is, the resolution characteristic correction portion 32 decides the intensity of the correction based on a relationship, measured in advance, between the type of paper sheet P and the intensity of the correction corresponding to the type of paper sheet P.

The resolution characteristic correction portion 32 acquires the inspection image data from the data acquisition portion 31 (step S103).

Furthermore, the resolution characteristic correction portion 32 corrects the blur in the inspection image data (step S104).

The inspection image data after the correction is output to the edge extraction portion 33 (step S105).

According to the form described in detail above, even in a case where the paper sheet on which the image is printed floats, the effect of the floating is unlikely to be received. That is, in a case where the paper sheet floats, the blur occurs in the read image. In the present exemplary embodiment, the degree of blur is reduced by correcting the blur. Consequently, inspection accuracy is improved. In addition, in the present exemplary embodiment, a location of occurrence of the blur is recognized in advance depending on the type of paper sheet. In addition, the degree of occurrence of the blur may also be recognized. In performing printing, the blur is corrected using the location of occurrence of the blur recognized in advance depending on the type of paper sheet and the intensity. Accordingly, inspection and setting of the location for performing the correction and the intensity are not necessary at each printing, and work efficiency is improved.

Description of Program

Here, processing performed by the image inspection apparatus 30 in the present exemplary embodiment described above is implemented by cooperation between software and hardware resources. That is, a CPU inside a control computer provided in the information processing apparatus 40 implements each function of the image inspection apparatus 30 by executing a program for implementing each function.

Thus, in the present exemplary embodiment, the processing performed by the image inspection apparatus 30 is perceived as a program causing a computer to implement a function of acquiring printing data that is data as a base of an image to be printed, a function of acquiring read data that is data obtained by reading the image printed on a paper sheet, a function of performing, on the read data, correction of a blur caused by floating of the paper sheet occurring in the reading of the image, and a function of inspecting the image by comparing the printing data with the read data after the correction.

The program implementing the present exemplary embodiment can be not only provided by communication means but also provided by storing the program in a recording medium such as a CD-ROM.

While the present exemplary embodiment is described above, the technical scope of the present invention is not limited to the scope disclosed in the exemplary embodiment. As is apparent from the disclosure of the claims, the above exemplary embodiment to which various modifications or improvements are carried out also fall in the technical scope of the present invention.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image inspection apparatus comprising:
a processor configured to:
acquire printing data that is data as a base of an image to be printed;
acquire read data that is data obtained by reading the image printed on a paper sheet;
perform correction of a blur caused by floating of the paper sheet occurring in the reading of the image, on the read data; and
inspect the image by comparing the printing data with the read data after the correction,
wherein the correction is set in advance for each type of paper sheet by reading a test pattern printed in a center portion and both end portions of the paper sheet.

2. The image inspection apparatus according to claim 1, wherein the correction is set for each type of paper sheet assuming that the paper sheet floats along any one direction of a transport direction and a direction intersecting with the transport direction.

3. The image inspection apparatus according to claim 1, wherein the test pattern is printed in the center portion, both end portions on a long edge side, and both end portions on a short edge side of the paper sheet.

4. The image inspection apparatus according to claim 1, wherein intensity of the correction is changed between a center portion and an end portion of the paper sheet.

5. The image inspection apparatus according to claim 4, wherein the intensity of the correction is changed between the center portion and the end portion on one of a long edge side and a short edge side of the paper sheet, and the intensity of the correction is not changed between the center portion and the end portion on the other one of the long edge side and the short edge.

6. The image inspection apparatus according to claim 4, wherein the intensity of the correction is further decided in accordance with a spatial frequency of the image.

7. The image inspection apparatus according to claim 6, wherein the intensity of the correction includes a range in which the intensity of the correction is decreased as the spatial frequency is increased.

8. The image inspection apparatus according to claim 7, wherein a relationship between the spatial frequency and the intensity of the correction is a convex upward function.

9. An image inspection system comprising:
a printing apparatus that prints an image on a paper sheet;
a reading apparatus that reads the image printed on the paper sheet by the printing apparatus; and
an inspection apparatus that inspects the image read by the reading apparatus,
wherein the inspection apparatus includes a processor, and
the processor is configured to:
   acquire printing data that is data as a base of the image,
   acquire read data that is data obtained by reading the image printed on the paper sheet,
   perform correction of a blur caused by floating of the paper sheet occurring in the reading of the image, on the read data, and
   inspect the image by comparing the printing data with the read data after the correction,
wherein the correction is set in advance for each type of paper sheet by reading a test pattern printed in a center portion and both end portions of the paper sheet.

10. A non-transitory computer readable medium storing a program causing a computer to implement:
   a function of acquiring printing data that is data as a base of an image to be printed;
   a function of acquiring read data that is data obtained by reading the image printed on a paper sheet;
   a function of performing correction of a blur caused by floating of the paper sheet occurring in the reading of the image, on the read data; and
   a function of inspecting the image by comparing the printing data with the read data after the correction,
wherein the correction is set in advance for each type of paper sheet by reading a test pattern printed in a center portion and both end portions of the paper sheet.

* * * * *